United States Patent
Reinke et al.

(10) Patent No.: US 10,276,050 B2
(45) Date of Patent: Apr. 30, 2019

(54) METHOD MAKING IT POSSIBLE TO IDENTIFY THE PROXIMITY OF A WAKE TURBULENCE AND TO GENERATE A REPORT RELATIVE TO THAT PROXIMITY

(71) Applicants: AIRBUS OPERATIONS (S.A.S.), Toulouse (FR); AIRBUS (S.A.S.), Blagnac (FR)

(72) Inventors: Andreas Reinke, Le Castera (FR); Sebastian Kauertz, Toulouse (FR)

(73) Assignees: Airbus Operations (S.A.S.), Toulouse (FR); Airbus (S.A.S.), Blagnac (FR)

( * ) Notice: Subject to any disclaimer, the term of this patent is extended or adjusted under 35 U.S.C. 154(b) by 55 days.

(21) Appl. No.: 15/594,242

(22) Filed: May 12, 2017

(65) Prior Publication Data
US 2017/0337822 A1 Nov. 23, 2017

(30) Foreign Application Priority Data

May 19, 2016 (FR) ...................................... 16 54482

(51) Int. Cl.
*B64D 45/00* (2006.01)
*G08G 5/00* (2006.01)

(52) U.S. Cl.
CPC .......... *G08G 5/0013* (2013.01); *B64D 45/00* (2013.01); *G08G 5/0008* (2013.01); *G08G 5/0021* (2013.01); *G08G 5/0091* (2013.01)

(58) Field of Classification Search
CPC .. G08G 5/0004; G08G 5/0008; G08G 5/0013; G08G 5/0021; G08G 5/0091; B64D 45/00
See application file for complete search history.

(56) References Cited

U.S. PATENT DOCUMENTS 5,657,009 A   8/1997  Gordon
5,724,040 A   3/1998  Watnick
(Continued)

FOREIGN PATENT DOCUMENTS

AU   2003301511 A1   2/2005
CA      2536671 A1   2/2005
(Continued)

OTHER PUBLICATIONS

Prince, Jason B. et al., "In-service evaluation of the turbulence auto-PIREP system and enhanced turbulence radar technologies", NASA/CR-2007-214887, Langley Research Center, Jul. 2007, 95 pages (Year: 2007).*

(Continued)

*Primary Examiner* — Behrang Badii
*Assistant Examiner* — David A Testardi
(74) *Attorney, Agent, or Firm* — Jenkins, Wilson, Taylor & Hunt, P.A.

(57) ABSTRACT

A method to identify the proximity of a wake turbulence and to generate a report relative to that proximity. A method implemented by an aircraft comprising a processor makes it possible to identify the proximity of a wake turbulence and to generate a report relative to that proximity. The method includes a data acquisition step during which the processor retrieves and records the data relative to each generating aircraft present around the aircraft. In a position estimation step, the processor estimates the position of the wake turbulences generated by each generating aircraft. In a proximity step, the processor determines if the aircraft is close to at least one of the wake turbulences. In a generation step, the processor generates a report containing the data relative to each wake turbulence. The method makes it possible to identify the proximity of a wake turbulence in the (Continued)

vicinity of the aircraft and to automatically record the data relative to that wake turbulence.

6 Claims, 5 Drawing Sheets

(56) References Cited

U.S. PATENT DOCUMENTS

| | | | |
|---|---|---|---|
| 5,845,874 A | 12/1998 | Beasley | |
| 6,160,498 A * | 12/2000 | Zweifel | G01W 1/02 340/949 |
| 6,177,888 B1 * | 1/2001 | Cabot | G01C 23/00 340/968 |
| 6,381,538 B1 | 4/2002 | Robinson et al. | |
| 6,650,972 B1 | 11/2003 | Robinson et al. | |
| 6,917,860 B1 | 7/2005 | Robinson et al. | |
| 6,963,291 B2 | 11/2005 | Holforty et al. | |
| 7,333,030 B2 | 2/2008 | Baranov et al. | |
| 7,463,955 B1 | 12/2008 | Robinson et al. | |
| 7,471,995 B1 | 12/2008 | Robinson | |
| 7,686,253 B2 | 3/2010 | Lewis et al. | |
| 7,765,090 B2 | 7/2010 | Nakayama et al. | |
| 8,000,848 B2 | 8/2011 | Baranov et al. | |
| 8,131,407 B1 * | 3/2012 | Robinson | G01C 23/00 340/945 |
| 8,135,500 B1 * | 3/2012 | Robinson | G01C 23/00 701/14 |
| 8,376,284 B2 | 2/2013 | Lewis et al. | |
| 8,478,459 B2 | 7/2013 | Mutuel et al. | |
| 8,629,788 B1 * | 1/2014 | Greenleaf | G08G 5/0091 244/116 |
| 8,949,014 B2 | 2/2015 | Bateman et al. | |
| 9,037,319 B2 | 5/2015 | Conner et al. | |
| 9,047,770 B2 | 6/2015 | Lafon et al. | |
| 9,824,593 B1 | 11/2017 | Kronfeld et al. | |
| 10,055,998 B1 * | 8/2018 | Reinke | G08G 5/0026 |
| 2002/0075171 A1 | 6/2002 | Kuntman et al. | |
| 2002/0171563 A1 | 11/2002 | Djorup | |
| 2003/0222795 A1 * | 12/2003 | Holforty | B64D 43/00 340/968 |
| 2006/0244637 A1 | 11/2006 | Baranov et al. | |
| 2007/0103340 A1 | 5/2007 | Baranov et al. | |
| 2007/0294066 A1 | 12/2007 | Nakayama et al. | |
| 2008/0030375 A1 | 2/2008 | Cotton et al. | |
| 2008/0035784 A1 * | 2/2008 | Meserole | G08G 5/0008 244/3.1 |
| 2008/0035789 A1 | 2/2008 | Lewis et al. | |
| 2008/0119971 A1 * | 5/2008 | Deker | G08G 5/0008 701/9 |
| 2008/0195264 A1 * | 8/2008 | Deker | G05D 1/0204 701/7 |
| 2008/0255714 A1 * | 10/2008 | Ross | G01S 7/003 701/14 |
| 2010/0114407 A1 * | 5/2010 | Klooster | G05D 1/0005 701/3 |
| 2010/0277347 A1 | 11/2010 | Judd | |
| 2010/0283635 A1 * | 11/2010 | Brinkman | G01C 23/00 340/961 |
| 2011/0004398 A1 | 1/2011 | Stayton et al. | |
| 2011/0187588 A1 * | 8/2011 | Khatwa | G01C 23/00 342/26 B |
| 2011/0257818 A1 * | 10/2011 | Ganz | G01W 1/00 701/14 |
| 2011/0270992 A1 | 11/2011 | Judd et al. | |
| 2012/0054641 A1 | 3/2012 | Sae-Chim et al. | |
| 2013/0080043 A1 | 3/2013 | Ballin et al. | |
| 2014/0039785 A1 * | 2/2014 | Bateman | G08G 1/096725 701/301 |
| 2014/0136110 A1 * | 5/2014 | Nykl | G01W 1/02 702/3 |
| 2015/0088342 A1 * | 3/2015 | Conner | G01W 1/10 701/14 |
| 2015/0235559 A1 | 8/2015 | Alekseev et al. | |
| 2016/0328981 A1 * | 11/2016 | Herder | G08G 5/0021 |
| 2017/0006619 A1 | 1/2017 | Papp et al. | |
| 2017/0057620 A1 * | 3/2017 | Kossentini | B64C 13/503 |

FOREIGN PATENT DOCUMENTS

| | | | | |
|---|---|---|---|---|
| CN | 1906501 A | 1/2007 | | |
| CN | 101501595 A | 8/2009 | | |
| CN | 1906501 B | 5/2010 | | |
| DE | 10039109 A1 * | 2/2002 | | B64C 23/06 |
| DE | 10039109 A1 | 2/2002 | | |
| EA | 008091 B1 | 2/2007 | | |
| EA | 008093 B1 | 2/2007 | | |
| EP | 1653250 A1 | 5/2006 | | |
| EP | 1653250 A4 | 9/2007 | | |
| EP | 2076826 A2 | 7/2009 | | |
| KR | 20090048579 A | 5/2009 | | |
| RU | 201210900 A | 1/2000 | | |
| RU | 2007/131794 A | 2/2009 | | |
| RU | 2496121 C1 | 10/2013 | | |
| WO | WO 2005010555 A1 | 2/2005 | | |
| WO | WO 2007115359 A1 | 10/2007 | | |
| WO | WO 2008002675 A2 | 1/2008 | | |
| WO | WO 2008002675 A3 | 4/2008 | | |
| WO | WO 2009/029005 A2 | 3/2009 | | |

OTHER PUBLICATIONS

Cole, Rodney E. et al., "Wind Prediction to Support Reduced Wake Separation Standards for Closely Spaced Parallel Runway Departures", Paper P2.1, Proceedings of the 11th Conference on Aviation, Range and Aerospace Meteorology, Hyannis, MA, 2004, 8 pages (Year: 2004).*

Krozel, Jimmy et al., "Modeling and feedback of turbulence hazards based on automated real-time pilot reports", Paper AIAA 2009-6066, AIAA Guidance, Navigation, and Control Conference, Aug. 10-13, 2009, Chicago, Illinois, 16 pages (Year: 2009).*

Preinterview First Office Action for U.S. Appl. No. 15/687,139 dated Feb. 23, 2018.

Notice of Allowance and Interview Summary for U.S. Appl. No. 15/687,139 dated Apr. 12, 2018.

ATR—AeroTech Research (U.S.A.), Inc., "In Situ Wake Vortex Encounter Detection and Reporting System (VEDARS)," www.atr-usa.com, p. 1, dated Jun. 23, 2017.

ICAO, "Collection of information on wake vortex encounters," AN 13/4-07/67, pp. 1-6, dated Oct. 26, 2007.

Reinke, "Wake encounter severity metrics as input to monitoring requirement," WN3-E Specific Workshop on "Incident and accident monitoring and analysis,"NLR, Amsterdam, pp. 1-15, dated Nov. 18, 2010.

Berdahl, et al., "Eduction of Swirling Structure Using the Velocity Gradient Tensor," AIAA 22nd Fluid Dynamcs, Plasma Dynamics & Lasers Conference, XX, XX, vol. 91, pp. 1823-1-1823-12, XP002994423, dated Jun. 1, 1991.

Berdahl, et al., "Eduction of Swirling Structure Using the Velocity Gradient Tensor,"AIAA Journal, vol. 31, No. 1, pp. 97-103, dated Jan. 1993.

Cucitore, et al., "On the effectiveness and limitations of local criteria for the identification of a vortex," European Journal of Mechanics B. Fluids, Gauthier-Villars, Paris, France, vol. 18, No. 2, pp. 261-282, XP022553555, ISSN: 0997-7546, dated Mar. 1, 1999.

French Search Report for Application No. 1654482 dated Sep. 22, 2016.

Notice of Allowance for U.S. Appl. No. 15/687,139 dated Jul. 11, 2018.

* cited by examiner

METHOD MAKING IT POSSIBLE TO IDENTIFY THE PROXIMITY OF A WAKE TURBULENCE AND TO GENERATE A REPORT RELATIVE TO THAT PROXIMITY

CROSS-REFERENCE TO RELATED APPLICATION

This application claims the benefit of and priority to French patent application number FR 16 54482 filed on May 19, 2016, the entire disclosure of which is incorporated by reference herein.

TECHNICAL FIELD

The present disclosure relates to a method used in an aircraft and making it possible to identify the proximity of a wake turbulence and to generate a report relative to that proximity, as well as to an aircraft that can implement such a method.

BACKGROUND

In the context of aeronautical navigation, each aircraft can be subjected to turbulences which arise from the atmospheric environment or from other aircraft.

When it is in flight, an aircraft generates a vortex behind each wing. When another aircraft encounters one of these wake turbulences, its flight behavior is disturbed. The data relative to these encounters with wake turbulences are not regularly or optimally collected. In fact these data are generally collected by the pilots either in a succinct manner, or after the event, which gives a set of piecemeal data which does not allow a rigorous and complete study.

SUMMARY

A purpose of the present disclosure is to disclose a method making it possible to identify the proximity of a wake turbulence and to generate a report relative to that proximity. Thus, all of the data are collected and then allow a more rigorous analysis.

For this purpose, a method implemented by an aircraft comprises a processor, and the method makes it possible to identify the proximity of a wake turbulence generated by at least one generating aircraft and to generate a report relative to that proximity. The method comprises:

a data acquisition step during which the processor retrieves and records the data relative to each generating aircraft present around the aircraft;

a position estimation step during which the processor estimates the position of the wake turbulences generated by each generating aircraft;

a proximity step during which the processor determines if the aircraft is close to at least one of the wake turbulences whose positions have thus been estimated; and a generation step during which the processor generates a report containing the data relative to each wake turbulence which has been considered as being close.

Such a method thus makes it possible to identify the proximity of a wake turbulence in the vicinity of the aircraft and to automatically record the data relative to that wake turbulence.

Advantageously, the method comprises, after the proximity step, a first computation and comparison step which breaks down into or comprises a first computation sub-step, during which the processor computes the external moments to which the aircraft is subjected, and a first comparison sub-step, during which the processor compares these moments with threshold values, and during the generation step the processor generates the report if, moreover, the first comparison sub-step is positive.

Advantageously, the method comprises, after the proximity step, a second computation and comparison step which breaks down into or comprises a second computation sub-step during which the processor retrieves the data relative to the speed of the air around the aircraft and computes a measurement value on the basis of these data and a second comparison sub-step during which the processor compares this measurement value with a threshold value and, during the generation step, the processor generates the report if, moreover, the second comparison sub-step is positive.

Advantageously, the method comprises, before the generation step, an evaluation step which breaks down into or comprises an evaluation sub-step, during which the processor evaluates parameters relative to the passage through a wake turbulence, and a third comparison sub-step, during which the processor compares these parameters with threshold values, and during the generation step the processor generates the report if the third comparison sub-step is positive.

Advantageously, the method comprises, after the generation step, a transmission step during which the processor sends the generated report to a ground installation.

The disclosure herein also discloses an onboard system of an aircraft comprising a processor configured for implementing:

a data acquisition step during which the processor retrieves and records the data relative to each generating aircraft present around the aircraft;

a position estimation step during which the processor estimates the position of the wake turbulences generated by each generating aircraft;

a proximity step during which the processor determines if the aircraft is close to at least one of the wake turbulences whose positions have been thus estimated; and a generation step during which the processor generates a report containing the data relative to each wake turbulence which has been considered as being close.

The disclosure herein also proposes an aircraft comprising such an onboard system.

BRIEF DESCRIPTION OF THE DRAWINGS

The features of the disclosure herein mentioned above, as well as others, will appear more clearly on reading the following description of an example embodiment, the description being given with reference to the appended drawings, among which.

DETAILED DESCRIPTION

Figure 1:
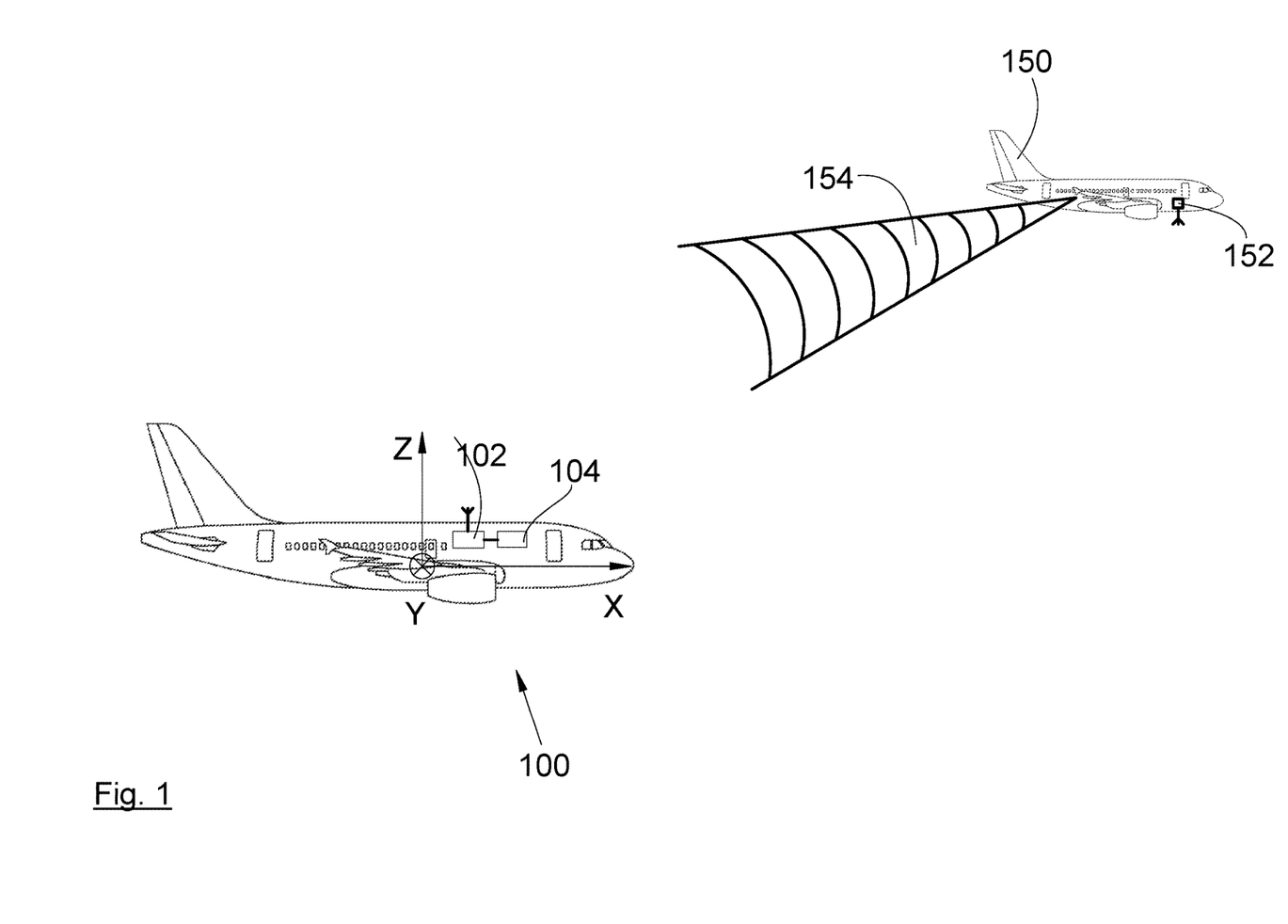
FIG. 1 shows an aircraft according to one embodiment of the disclosure herein, in its in-flight environment.

FIG. 1 shows an aircraft 100, which is in flight and which comprises, among other things, a receiver 102 and an identification and generation device 104.

In the following description, and by convention, X refers to the longitudinal axis of the aircraft 100 oriented positively in the direction of forward travel of the aircraft 100, Y refers to the transverse axis of the aircraft 100 which is horizontal when the aircraft 100 is on the ground, and Z refers to the vertical axis or vertical height when the aircraft 100 is on the ground, these three directions X, Y and Z being orthogonal with respect to each other and forming an orthonormal reference frame at the center of gravity of the aircraft 100.

The receiver 102 is a wireless transmission receiver which makes it possible to receive data transmitted by a distant wireless transmission transmitter 152, using various standards such as for example UHF, VHF, ADS-B, etc.

The transmitter 152 is located in a generating aircraft 150 which generates wake turbulences 154. In the embodiment of the disclosure herein shown here, there is a single generating aircraft 150 but the disclosure herein is applicable in the same way when there are more than one of them.

Figure 2:
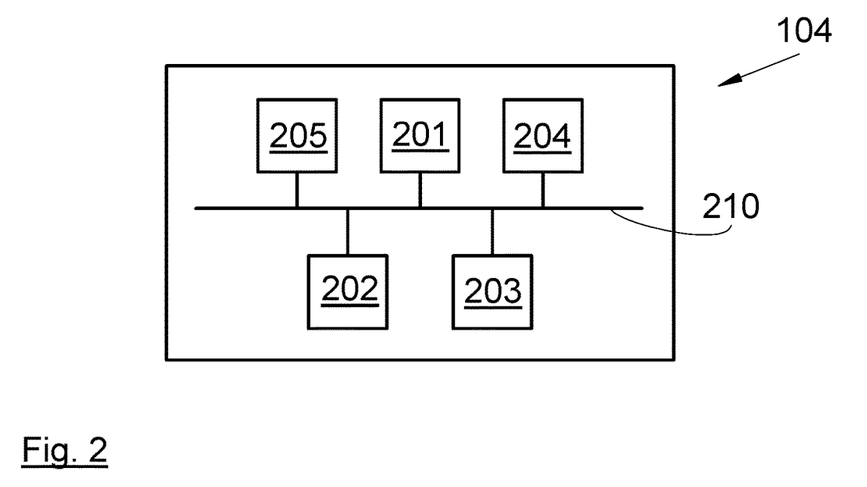
FIG. 2 shows the architecture of an identification and generation device implementing the method according to one embodiment of the disclosure herein.

FIG. 2 shows the identification and generation device 104 which comprises, connected by a communication bus 210: a processor 201 or CPU (standing for "Central Processing Unit" in English), a random access memory RAM (standing for "Random Access Memory" in English) 202, a read only memory ROM (standing to "Read Only Memory" in English) 203, a storage unit 204 such as a hard disk or a storage medium reader, such as an SD (standing for "Secure Digital" in English) card reader, at least one communication interface 205, for example allowing the identification and generation device 104 to communicate with the receiver 102 and with the navigation systems of the aircraft 100.

The identification and generation device 104 constitutes an onboard system of the aircraft 100 which comprises the processor 201 configured for implementing the steps of the method described below.

The processor 201 is capable of executing instructions loaded into the RAM 202 from the ROM 203. When the identification and generation device 104 is powered up, the processor 201 is capable of reading instructions from the RAM 202 and of executing them. These instructions form a computer program causing the implementation, by the processor 201, of all or some of the algorithms and steps described with reference to FIG. 3.

All or some of the algorithms and steps described below can be implemented in software form by the execution of a set of instructions by a programmable machine, for example a DSP (standing for "Digital Signal Processor" in English) or a microcontroller, or can be implemented in hardware form by a machine or a dedicated component, for example an FPGA (standing for "Field-Programmable Gate Array" in English) or an ASIC (standing for "Application-Specific Integrated Circuit" in English).

A purpose of the disclosure herein is to identify each generating aircraft 150, to estimate the position of the wake turbulences generated by each of them, to estimate if each wake turbulence thus determined is or is not close to the aircraft 100 and to generate a report according to the result of this estimation. As explained below, the proximity of wake turbulences with respect to the aircraft 100 is determined as a function of the effects of the wake turbulences on measurements carried out on board the aircraft 100 by various existing sensors.

Figure 3:
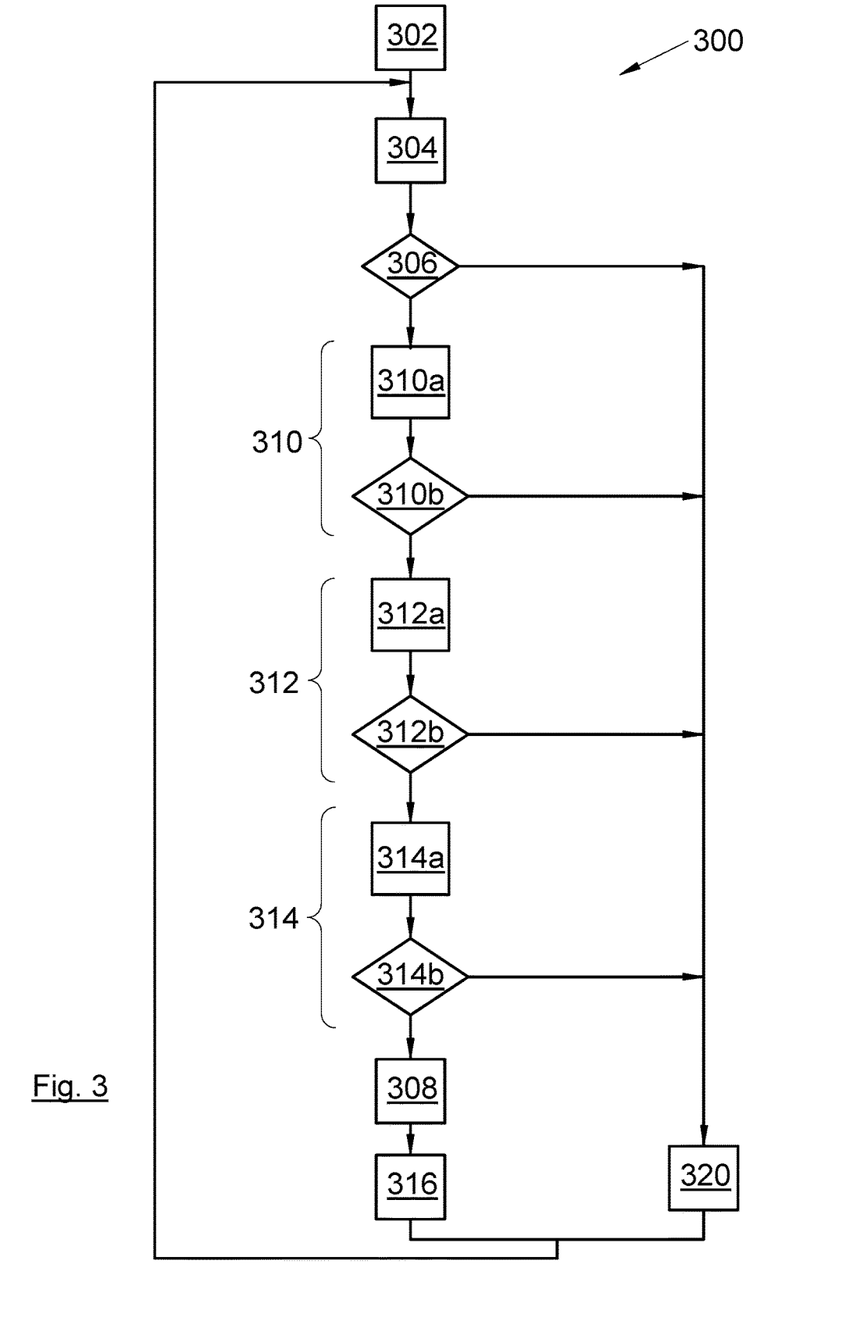
FIG. 3 is an algorithm of a method according to one embodiment of the disclosure herein and which makes it possible to identify the proximity of a wake turbulence and to generate a report relative to that proximity.

FIG. 3 shows an algorithm 300 of the method which makes it possible to identify the proximity of a wake turbulence and to generate a report relative to that proximity. This method is implemented by the identification and generation device 104 of the aircraft 100.

The method 300 comprises:
 a data acquisition step 302 during which the device 104, and more particularly the processor 201, retrieves and records the data received from the receiver 102 and which are relative to each generating aircraft 150 present around the aircraft 100,
 a position estimation step 304 during which the device 104, and more particularly the processor 201, estimates the position of the wake turbulences 154 generated by each surrounding generating aircraft 150,
 a proximity step 306 during which the device 104, and more particularly the processor 201, determines if the aircraft 100 is close to one of the wake turbulences 154 whose positions have thus been estimated, and
 a generation step 308 during which the device 104, and more particularly the processor 201, generates a report containing the data relative to each wake turbulence 154 which has been considered as being close.

The generation step 308 is carried out if the proximity step 306 has made it possible to assure that the aircraft 100 is close to at least one wake turbulence 154. In other words, during the proximity step 306, the processor 201 checks if the aircraft 100 is in the vicinity of a wake turbulence 154 and, in the positive case, it generates the report during the generation step 308 and, in the negative case, the method 300 moves on to a stop step 320.

During the acquisition step 302, the data are received by the processor 201 and recorded in the RAM 202. The data are acquired for example via a monitoring system of the ADS-B type. The processor 201 receives the data from each surrounding generating aircraft 150 which repetitively transmits its latitude, its longitude and its altitude. The data relative to the speed and the direction of the wind, to the true speed and to the true heading can also be transmitted. The processor 201 associates each item of data with a surrounding generating aircraft 150.

During the position estimation step 304, the processor 201 estimates, for each surrounding generating aircraft 150, the probable position of the wake turbulences generated by the generating aircraft 150 by using its past and present positions, as well as the wind measured on the aircraft 100, or transmitted via an air-to-air transmission link from the generating aircraft 150, or uploaded from the ground.

According to a particular embodiment, the processor 201 uses these data for computing the average position of a central line of the wake turbulences generated by each surrounding generating aircraft 150 at the present time. The horizontal position is computed from the current position of the generating aircraft 150 and preferably from several of its preceding positions and from the horizontal speed of the wind. The current horizontal position of the wake turbulence created by the generating aircraft 150 when it was in a preceding position is computed as a function of the average speed of the wind and the time since the passage of the generating aircraft 150 through the preceding position in question. The central line of the wake turbulences corresponds to the set of segments step by step connecting all of these successively computed horizontal positions. The central line of the wake turbulences can be non-linear, for example as a result of maneuvers of the generating aircraft 150 and/or of variations of the wind.

The vertical position of the wake turbulences is computed by making assumptions regarding the maximum and minimum distance of descent at the end of the lifetime of the wake turbulences, which are for example −1000 feet and 0 feet respectively. The average position of the central line is thus considered as being at −500 feet or about 150 m below the trajectory of the generating aircraft 150 at the end of the lifetime of the wake turbulences. For a lifetime of the wake turbulences of 180 seconds, an average descent speed of −0.83 m/s is used for computing the altitude of the wake turbulences at any distance behind the generating aircraft 150.

According to another particular embodiment, more sophisticated models for the evaluation of the current average position of the wake turbulences can be used, like the P2P, APA or PVM probabilistic wake prediction models.

The following description is an example of implementation in which, after the determination of the central line of the wake turbulences, the processor 201 determines, during the position estimation step 304, a volume in which the wake turbulences of a generating aircraft 150 whose effects are likely to influence the behavior of the aircraft 100 are present is estimated. After the determination of this volume, the processor 201 determines, during the proximity step 306, the presence or not of the aircraft 100 in the volume, which qualifies or not the wake turbulences of the generating aircraft 150 for being mentioned in the report.

The determination of the volume can be based on an evaluation of the uncertainty in the position of the wake turbulences. In the horizontal position, the uncertainty is dependent on the accuracy of the speed of the wind which is used for computing the displacement of the wake turbulences starting from the trajectory of the generating aircraft 150 and on the uncertainty of the position of the generating aircraft 150.

Typically, the uncertainty in the onboard measurements of wind speed is of the order of a standard deviation of $\sigma_w$=2 m/s. When the measurement of the speed of the wind is only available on the aircraft 100, an addition of a supplementary uncertainty of 1 m/s results in $\sigma_w$=3 m/s. The horizontal position uncertainty is considered as increasing linearly from the actual position of the generating aircraft 150 to the position 180 seconds behind it. To this can be added a constant uncertainty of the positions reported by the generating aircraft 150. An analysis of the data of the ADS-B system shows that for a majority of commercial aircraft, this uncertainty is below $\sigma_f$=±0.1 N M or $\sigma_f$=±185 m.

In the vertical direction, the uncertainty in the descent of the wake turbulences can be considered as being 0 m at 0 s and ±150 m after 180 seconds. To this can be added a typical uncertainty in the altitude reported by the generating aircraft 150 and considered as $\sigma_v$=±50 m irrespective of the age of the wake turbulences.

A condition for the horizontal distance $\Delta y_c$ to the central line of the wake turbulences as a function of the age $\Delta t$ of the wake turbulences of the closest point along the central line can be formulated as follows, considering a standard deviation of $\sigma_w$ for the speed of the wind:

$$\Delta y_c < 185 \text{ m} + \sigma_w \cdot \Delta t.$$

In order to take account of more uncertainty in the position of the wake turbulences, the condition can take account of two or three standard deviations of the speed of the wind.

A condition for the vertical distance $\Delta z_c$ to the central line of the wake turbulences can be formulated as follows:

$$|\Delta z_c| < 50 \text{ m} + \frac{150 \text{ m}}{180 \text{ s}} \cdot \Delta t.$$

Figure 4:
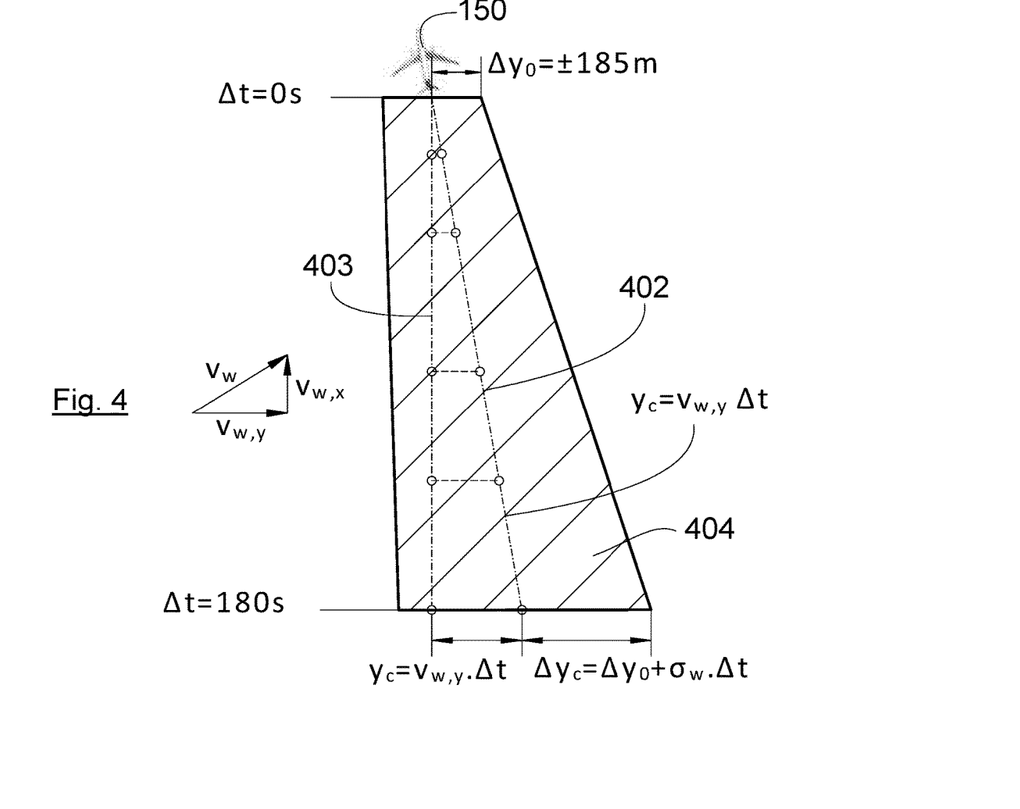
FIG. 4 is a plan view representing an estimation of the position of the wake turbulences.
Figure 5:
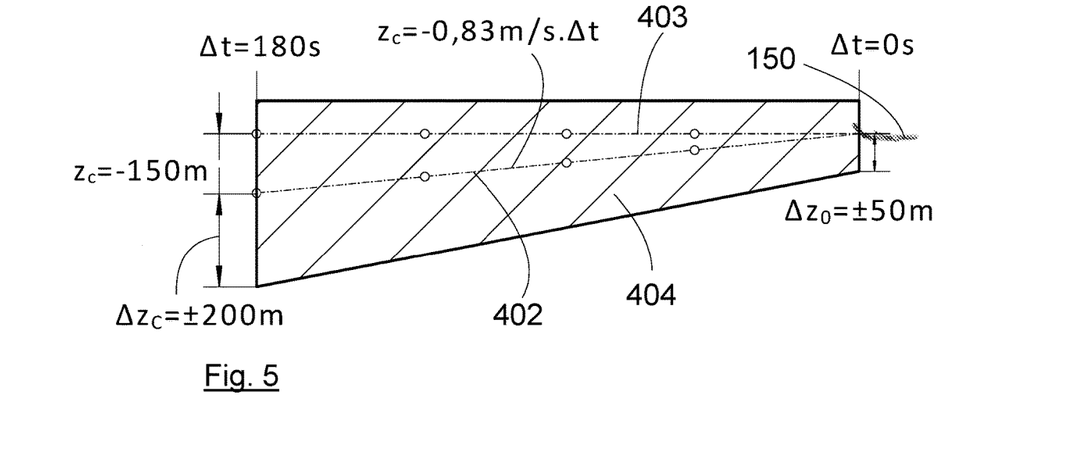
FIG. 5 is a side view representing an estimation of the position of the wake turbulences.

FIG. 4 shows a plan view of the example of the estimation of the position of the wake turbulences generated by the generating aircraft 150 and FIG. 5 shows a side view of it. The reference 402 represents the central line with respect to the trajectory of the generating aircraft 150 which is represented by the line 403. The equations of the central line 402 in a plane are given by $y_c = v_{w,y} \cdot \Delta t$ and $z_c = -0.83 \cdot \Delta t$, where $v_{w,y}$ represents the average value of the component of the wind perpendicular to the trajectory of the generating aircraft 150.

According to another embodiment, the longitudinal transport of the wake turbulence can also be computed as a function of the component of the wind $v_{w,x}$ parallel with the trajectory of the generating aircraft 150.

An area of proximity of the wake turbulences constructed on the basis of the above examples is the cross-hatched area 404 between $\Delta t$=0 s and $\Delta t$=180 s.

At $\Delta t$=0 s, $\Delta y_c = \Delta y_0 = \pm 185$ m and $\Delta z_c = \Delta z_0 = \pm 50$ m.

At $\Delta t$=180 s, $\Delta y_c = \Delta y_0 + 180 \cdot \sigma_w$ and $\Delta z_c = \pm 200$ m.

For a $\Delta t$ between 0 s and 180 s, $\Delta y_c = \Delta y_0 + \sigma_w \cdot \Delta t$ and $$\Delta z_c = \pm \left( \Delta z_0 + \frac{150}{180} \cdot \Delta t \right).$$

The dimensions of the volume delimiting the proximity area 404 can be computed as a function of time as described above, or of the distance along the central line of the wake turbulences 402 or of the age of the wake turbulences normalized according to the characteristics of the wake turbulences.

Figure 6:
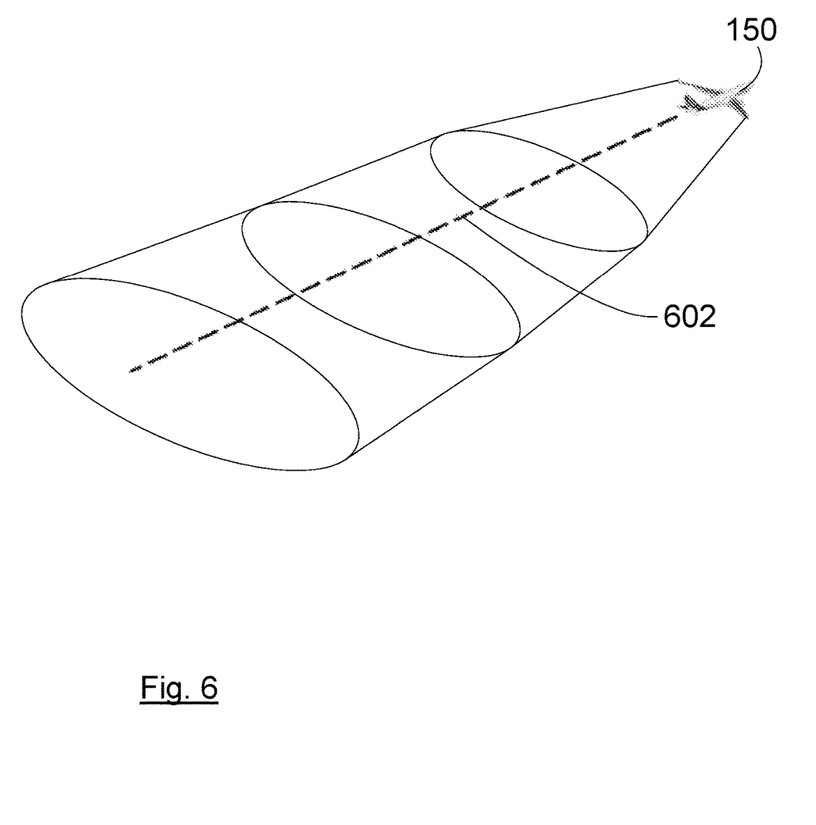
FIG. 6 is a perspective view representing an estimation of the position of the wake turbulences.

According to another embodiment, FIG. 6 shows that the uncertainty in the position of the wake turbulences can be expressed as an elliptical region around the position of estimated central line 602.

The equations mentioned above for evaluating the proximity area 404 can of course be different according to the type of the aircraft 100, of the generating aircraft 150, and to the conditions on the basis of which the disturbances suffered by the aircraft 100 must be taken into account.

If the aircraft 100 is present in the proximity area 404, the wake turbulences present in the proximity area 404 will be considered as being close and therefore taken into account for the continuation of the process and if the aircraft 100 is outside of the proximity area 404, the wake turbulences inside the proximity area 404 will not be taken into account.

According to a particular embodiment, the proximity of the wake turbulences with respect to the aircraft 100 is characterized by the lateral distance and the vertical distance of the aircraft 100 to the central line of the wake turbulences. The processor 201 thus compares the lateral and vertical distance of the aircraft 100 to the central line with the threshold values $\Delta y_c$ and $\Delta z_c$ calculated above and, if the distance is less than the two thresholds, this is considered as being close to a wake turbulence.

This method thus makes it possible to create a report which is complete and can be used subsequently for analyzing for example the behavior of the aircraft 100.

The method used here makes it possible to identify, practically in real time, the wake turbulences encountered by the aircraft 100, to store in the aircraft 100 the data relative to the wake turbulences together with the circumstances for an a posteriori analysis.

The capability of the method 300 to estimate the location of the generating aircraft 150 and the proximity of the wake turbulences generated is important because it makes it possible to validate that the turbulences that the aircraft 100 encounters are due to a generating aircraft 150 and not to meteorological elements.

According to a particular embodiment, external forces and moments which are due to a disturbance of the free air flow and which act on the movements of the aircraft 100 are taken into account in the method 300. According to a particular embodiment, these external forces and moments which are due to elements outside of the aircraft 100 and which are not therefore controlled by the flight controls of the aircraft 100 are recorded and integrated in the report.

The method 300 then comprises, after the proximity step 306 and when the aircraft 100 has been considered as being close to at least one wake turbulence 154, a first computation and comparison step 310 which breaks down into or comprises a first computation sub-step 310a during which the device 104, and more particularly the processor 201, computes the external moments to which the aircraft 100 is subjected, and a first comparison sub-step 310b during which the device 104, and more particularly the processor 201, compares these moments or a combination of these moments with threshold values.

In other words, during the first comparison sub-step 310b, the processor 201 checks if, from the point of view of the computed moments, the conditions relative to the passage through a wake turbulence 154 are jointly met. In the positive case, the processor 201 generates the report during the generation step 308 and, in the negative case, the method 300 moves on to the stop step 320.

The first comparison sub-step 310b is in addition to the proximity comparisons, that is to say that, in this embodiment, it is necessary for both conditions to be jointly present for the passage through a turbulence to be validated and for the report to be generated.

The generation step 308 is then implemented if, in addition, the first comparison sub-step 310b is positive, as explained below, which even better validates the fact that the aircraft 100 has encountered a wake turbulence 154.

As a function of an identification rule, examples of which are mentioned below, these external moments are considered as being due to wake turbulences.

According to a particular embodiment, only the roll and yaw moments are taken into account because these are the most critical moments when the aircraft 100 encounters wake turbulences.

The description below gives an example of a simplified computation of the external roll moment $C_{l,ext}$ and of the external yaw moment $C_{n,ext}$, such as can be executed during the computation sub-step, where:

$$C_{l,ext} = C_{l,tot} - C_{l,control} - C_{l,damping} \text{ and}$$

$$C_{n,ext} = C_{n,tot} - C_{n,control} - C_{n,damping},$$

and where $C_{l,tot}$ is the total roll moment undergone by the aircraft 100, $C_{l,control}$ is the roll control moment resulting from the control surfaces of the aircraft 100 (rudder, ailerons, spoilers . . . ), $C_{l,damping}$ is the aerodynamic roll damping moment undergone by the aircraft 100, $C_{n,tot}$ is the total yaw moment undergone by the aircraft 100, $C_{n,control}$ is the yaw control moment resulting from the control surfaces of the aircraft 100 (rudder, ailerons, spoilers . . . ), and $C_{n,damping}$ is the aerodynamic yaw damping moment undergone by the aircraft 100.

The total roll moment $C_{l,tot}$ and the total yaw moment $C_{n,tot}$ can be identified on the basis of roll and yaw inertial acceleration measurements, taking the inertial equations into account in the following form:

$$C_{l,tot} = \frac{I_{xx}\dot{p} - I_{xz}\dot{r}}{q.S.l_{Ref}} \text{ and}$$

$$C_{n,tot} = \frac{I_{zz}\dot{r} - I_{xz}\dot{p}}{q.S.l_{Ref}},$$

where $I_{xx}$, $I_{zz}$ and $I_{xz}$ are the moments of inertia and they are determined from the total mass using interpolation tables, q is the dynamic pressure computed from the density of the air ρ and from the true air speed, S is the reference surface area of the wings of the aircraft 100, $l_{Ref}$ is the reference length of the wings of the aircraft 100, $\dot{p}$ is the roll acceleration determined by a navigation system of the aircraft 100 and $\dot{r}$ is the yaw acceleration determined by the navigation system of the aircraft 100.

The roll control moment $C_{l,control}$ and the yaw control moment $C_{n,control}$ are expressed according to the number of control surfaces that the aircraft 100 comprises. For example, in the case of an aircraft 100 comprising four pairs of spoilers, one pair of ailerons, and a rudder, the moments are written as follows:

$$C_{l,control} = C_{l,\delta a} \cdot \delta a + \Sigma_{i=1}^{4} C_{l,\delta s,i} \cdot \delta s_i + C_{l,\delta r} \cdot \delta r, \text{ and}$$

$$C_{n,control} = C_{n,\delta a} \cdot \delta a + \Sigma_{i=1}^{4} C_{n,\delta s,i} \cdot \delta s_i + C_{n,\delta r} \cdot \delta r.$$

The roll damping moment $C_{l,damping}$ and the yaw damping moment $C_{n,damping}$ can be expressed on the basis of the following equations:

$$C_{l,damping} = C_{l,p} \frac{p.l_{Ref}}{V_{tas}}, \text{ and}$$

$$C_{n,damping} = C_{n,\beta} \cdot \beta + C_{n,r} \frac{r.l_{Ref}}{V_{tas}}.$$

In these different formulae:

$C_{l,p}$, $C_{n,\beta}$, $C_{n,r}$, $C_{l,\delta a}$, $C_{l,\delta s,i}$, $C_{l,\delta r}$, $C_{n,\delta a}$, $C_{n,\delta s,i}$, $C_{n,\delta r}$ are the aerodynamic coefficients of the aircraft 100 and of its control surfaces and they are determined as a function of the flight conditions, for example by using interpolation tables or appropriate formulae, p is the roll rate of the aircraft 100, r is the yaw rate of the aircraft 100, $V_{tas}$ is the true air speed, β is the side-slip angle of the aircraft 100, δa is the deflection of the ailerons of the aircraft 100, $\delta s_i$ is the deflection of the spoilers of the aircraft 100, δr is the deflection of the rudder of the aircraft 100, and $l_{Ref}$ is the reference length of the wings of the aircraft 100.

In order to use the interpolation tables some other data may also be necessary, such as for example the mass 'm' of the aircraft 100, the position of its center of gravity '$X_{CG}$' along the longitudinal axis of the aircraft 100 or the speed of the aircraft 100 through its Mach number or the calibrated air speed $V_{CAS}$.

The various values are known by construction, by calculating devices, or by sensors on board the aircraft 100.

According to another embodiment, it is possible also to take account of the pitch moment, the lift force, the side force, the drag force.

After the computation sub-step, the processor 201 compares the computed moments $C_{l,ext}$ and $C_{n,ext}$ with respect to threshold values, and if the computed moments are greater than the threshold values, this is considered as the fact that the aircraft 100 has encountered a wake turbulence 154.

The test carried out during the first comparison sub-step 310b in order to validate the passage through a wake turbulence 154 can take the form of various identification rules. For example, it is possible to verify that the two moments are greater than a threshold value, or that at least one of the two moments is greater than a threshold value, that a combination of the two moments is greater than a threshold value. The threshold values can be different for the roll moment ($C_{l-seuil}$) and the yaw moment ($C_{n-seuil}$). The first comparison sub-step 310b is positive if the required condition or conditions are met, in this case being greater than the threshold values.

This is represented as follows:

$C_{l,ext} > C_{l-seuil}$ and $C_{n,ext} > C_{n-seuil}$, or $C_{l,ext} > C_{l-seuil}$ or $C_{n,ext} > C_{n-seuil}$, or for example $\sqrt{C_{l,ext}^2 + C_{n,ext}^2} >$ Seuil.

The threshold values can be fixed at values resulting from prior analyses carried out during the passage through wake turbulences.

The threshold values can be adapted dynamically according to the flight conditions, for example as a function of the mass of the aircraft 100, or according to the ability of the aircraft to counter the external moments to which it is subjected.

The threshold values can be adapted dynamically by averaging the values of the external roll and yaw moments over a sufficiently long time during which no wake turbulence has been encountered.

The decision to validate the passage through a wake turbulence can also be validated as a function of the duration during which the computed moments are greater than the thresholds. If the duration is too short, for example less than 1 sec, the disturbance will not be taken into account and is considered as being an atmospheric disturbance and, if the duration is longer, the disturbance will be validated as being a wake turbulence. The minimum duration can be a fixed item of data or it can be dependent on the speed of the aircraft 100 and/or on the angle between the direction of flight of the aircraft 100 and the principal axis of extension of the wake turbulence of the generating aircraft 150 or a similar factor.

According to a particular embodiment, the components of the wind measured at the level of the aircraft 100 are taken into account in the method 300 and integrated in the report, this being in addition to or in replacement of the analysis of the external moments.

The method 300 then comprises, after the proximity step 306 and when the aircraft 100 has been considered as being close to at least one wake turbulence 154, a second computation and comparison step 312 which breaks down into or comprises a second computation sub-step 312a during which the device 104, and more particularly the processor 201, retrieves the data relative to the speed of the wind around the aircraft 100, and computes a measurement value on the basis of these data and a second comparison sub-step 312b during which the device 104, and more particularly the processor 201, compares this measurement value with a threshold value.

In other words, during the second comparison sub-step 312b, the processor 201 checks if, from the point of view of the data relative to the speed of the wind, the conditions relative to the passage through a wake turbulence 154 are met, as explained below, which amounts to checking that the measurement value is greater than a threshold value. In the positive case, the processor 201 generates the report during the generation step 308 and, in the negative case, the method 300 moves on to the stop step 320.

If the method does not comprise the first computation and comparison step 310, the second comparison sub-step 312b is in addition to the proximity comparisons, that is to say that, in this embodiment, it is necessary that the two conditions are jointly met in order for the passage through a turbulence to be validated.

If the method comprises the first computation and comparison step 310, the second computation and comparison step 312 can be before or after the first computation and comparison step 310 (for the example shown in FIG. 3, it is after).

If the method comprises the first computation and comparison step 310, the second comparison sub-step 312b is in addition to the proximity comparisons and to the first comparison sub-step 310b, that is to say that, in this embodiment, it is necessary that the three conditions are jointly met in order for the passage through a turbulence to be validated.

The generation step 308 is then used if, in addition, the second comparison step 312b is positive as explained below, which even better validates the fact that the aircraft 100 has encountered a wake turbulence 154.

After the stop step 320 and the transmission step 316, the method loops back to the position estimation step 304 in order to again identify the proximity of a wake turbulence.

As a function of an identification rule, examples of which are mentioned below, these data relative to speed are considered as being due to wake turbulences.

The data relative to the speed and to the orientation of the wind are present in the navigation systems of the aircraft 100 which comprise appropriate sensors and can therefore be retrieved by the processor 201.

An example of computation implemented in the second computation sub-step 312a is explained below. The computation method is based on the geodesic components of the speed of the wind and which are available on board the aircraft 100. The components are:

$u_{wg}$: the component of the wind speed along the longitudinal axis X, generally the north, $v_{wg}$: the component of the wind speed along the transverse axis Y, generally the east, and $w_{wg}$: the component of the wind along the vertical axis of the wind speed Z, generally downwards.

The components are retrieved in a discrete manner by the processor 201, at a frequency f which is preferably at least equal to 8 Hz.

The method consists of or comprises evaluating the variations of the components of the wind and spotting their disturbances. The spotting of these disturbances in the components makes it possible to identify the passage through a wake turbulence 154. The disturbances for example take the form of large variations of the components over a short time (a few seconds).

In the embodiment of the disclosure herein described here, the components are combined in a measurement value with which a threshold is associated. The second comparison sub-step 312b then consists of or comprises checking if the measurement value is greater than the threshold value or not.

The measurement value here is the kinetic energy of the turbulence (TKE), which is the average kinetic energy per unit of mass associated with vortices in a turbulent flow. The kinetic energy of the turbulence is defined as an instantaneous value, but it can be computed as an average over a period of time using a quantification by the average of the normal tensions of the turbulence.

When the kinetic energy of the turbulence is computed, several parameters can be freely adjusted, such as for example:
  the width of the time window for establishing the average of the reference background or base,
  the width of the time window for establishing the average of the variances about the reference average,
  the number of samples or the frequency used for establishing the reference average,
  the number of samples or the frequency used for establishing the average of the variances.

Typically, the same widow width is used for establishing the reference average and the variances average.

The kinetic energy of the turbulence is computed as the sum of the mean square variations of the variations of the wind speed components about an average value, computed over a given time window, the formula of which is:

$$TKE = \frac{1}{2}\left[\overline{(u'_{wg})^2} + \overline{(v'_{wg})^2} + \overline{(w'_{wg})^2}\right], \text{ where}$$

$$u'_{wg} = u_{wg} - \overline{u_{wg}},\ v'_{wg} = v_{wg} - \overline{v_{wg}},\text{ and}$$

$$w'_{wg} = w_{wg} - \overline{w_{wg}}.$$

Depending on the different embodiments, it is possible to use less than three components, to express the components in a reference frame other than the geodesic reference frame, to use and combine other measurements related to the wind (angle of attack, side-slip angle, true air speed, load factors) on the aircraft 100.

The continuous evaluation of the measurement value (TKE in this case) makes it possible to verify if its value goes above the threshold value representative of the passage through a wake turbulence 154. The threshold values can be fixed at values resulting from prior analyses carried out during the passage through wake turbulences.

The threshold value can be adapted dynamically to the medium or long term base turbulence level in order to limit incorrect detections.

The decision to validate the passage through a wake turbulence can also be validated as a function of the duration during which the computed measurement value is greater than the threshold value. If the duration is too short, for example less than 1 sec, the disturbance will not be taken into account and will be considered to be an atmospheric disturbance which is not related to a wake turbulence or to be a brief signal loss or error and, if the duration is greater, the disturbance will be validated as being a wake turbulence. The minimum duration can be a fixed item of data or it can be dependent on the speed of the aircraft 100 and/or on the angle between the direction of flight of the aircraft 100 and the principal axis of extension of the wake turbulence of the generating aircraft 150 or a similar factor.

The test carried out during the second comparison sub-step 312b for validating the passage through a wake turbulence 154 then consists of or comprises checking that the measurement value is greater than the threshold value. The second comparison sub-step 312b is positive if the required condition is met, in this case the measurement value being higher than the threshold value.

According to a particular embodiment, the severity of a wake turbulence can also be taken into account in the method. The severity can be evaluated by quantifying the impact of the wake turbulences on the aircraft 100, such as for example an unusual behavior, a loss of altitude, a deviation with respect to the route followed, large load factors, and/or large accelerations in the cabin of the aircraft 100.

When a report must be generated, that is to say after the proximity step 306 and possibly the comparison sub-steps 310b and 312b have been validated, the method 300 comprises, before the generation step 308, an evaluation step 314 which comprises an evaluation sub-step 314a during which the device 104, and more particularly the processor 201, evaluates parameters relative to the passage through a wake turbulence 154.

These parameters are for example one or more of the following parameters:
  roll and pitch angles;
  maximums of the lateral and vertical load factors at the center of gravity of the aircraft 100 or at another specific place;
  deviations with respect to the predicted flight trajectory;
  exceeding the normal aerodynamic envelope;
  structural loads;
  maximums of the external roll moments $C_{l,ext}$;
  maximums of the roll control ratios (RCR, standing for "Roll Control Ratio") (the ratio between the external roll moment and the available roll control power).

The evaluation step 314 then comprises a third comparison sub-step 314b, during which the device 104, and more particularly the processor 201, compares these parameters relative to the passage through a wake turbulence 154 with respect to threshold values of these parameters which are representative of a passage through a wake turbulence sufficiently severe to be reported. The threshold values can be fixed at values resulting from prior analyses carried out during the passage through wake turbulences. Only if these parameters exceed the threshold values, the third comparison sub-step 314b is positive and a report is created in the generation step 308. The parameters used for quantifying the severity of the passage are then inserted in the report during the generation step 308. In the contrary case, even if the passage through a wake turbulence is validated during the proximity step 306 and/or the comparison steps 10b and/or 312b, it is considered that it does not merit being reported and a report is not created during the generation step 308.

The receiver 102 can also constitute a transmitter and the method 300 can also comprise, after the generation step 308, a transmission step 316 during which the processor 201 transmits to the transmitter/receiver 102, the data of the report which are transmitted by the transmitter/receiver 102 to a remote receiver in a ground installation such as for example an air operations center (AOC), an air traffic control (ATC), etc. The transmission of this report can be carried out in flight or when the aircraft 100 is stationary on the tarmac.

The transmission of the report can of course be carried out by another transmitter of the aircraft 100.

The report comprises the information necessary for the identification of the aircraft 100 and the information relative to the wake turbulence 154 encountered by the aircraft 100. Examples of information are listed here:
- the identification of the aircraft 100, its type, its number, the flight number, its 24-bit ICAO identifier;
- its position (longitude, latitude, altitude), the start time and the end time of the event;
- the flight conditions of the aircraft 100 at the time of the event (autopilot, etc.);
- the meteorological conditions at the time and at the place of the event (for example: direction and speed of the wind (longitudinal, lateral and vertical components), temperature, ambient level of atmospheric turbulences);
- the parameters relative to the event;
- the parameters relative to the severity of the event;
- the identification of the generating aircraft 150 having generated the event;
- the flight trajectory, that is to say the position as a function of time of the generating aircraft 150 before, during and after the event;
- the identification of aircraft present in a given radius around the aircraft 100;
- the maximums of the external roll $C_{l,ext}$ and yaw $C_{n,ext}$ moments;
- the maximums of the roll control ratios ("Roll Control Ratio");
- the roll and pitch angles;
- the true heading;
- the lateral and vertical load factors;
- the true air speed;
- the kinetic energy of the turbulence (TKE);
- the lateral distance to the central line of the wake turbulence;
- the altitude relative to the central line of the wake turbulence;
- the values of the external roll moment $C_{l,ext}$ and of the external yaw moment $C_{n,ext}$.

Some of these items of information can be included in the report to be transmitted as a function of time.

The subject matter disclosed herein can be implemented in or with software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one exemplary embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method implemented by an aircraft comprising a processor, a receiver, and a transmitter, the method to identify a proximity of a wake turbulence generated by at least one generating aircraft and to generate a report relative to the proximity, the method comprising:
   a data acquisition step during which the processor retrieves and records data, received by the receiver, relative to each generating aircraft present around the aircraft;
   a position estimation step during which the processor estimates a position of wake turbulences generated by each generating aircraft;
   a proximity step during which the processor determines if the aircraft is close to at least one of the wake turbulences whose positions have been estimated;
   a first computation and comparison step which comprises a first computation sub-step, during which the processor computes external moments to which the aircraft is subjected, and a first comparison sub-step, during which the processor compares the moments with threshold values;
   a generation step during which the processor generates a report, in response to the first comparison sub-step being positive, containing data relative to each wake turbulence which has been considered as being close; and
   a transmission step during which the processor sends the report from the aircraft to a ground installation via the transmitter;
   wherein the threshold values are dynamically adapted according to medium or long term base turbulence levels, encountered by the aircraft, in order to limit incorrect detections.

2. The method as claimed in claim 1, comprising, after the proximity step, a second computation and comparison step which comprises a second computation sub-step during which the processor retrieves data relative to a speed of air around the aircraft and computes a measurement value based on the data and a second comparison sub-step during which the processor compares the measurement value with a threshold value and wherein, during the generation step, the processor generates the report in response to the second comparison sub-step being positive.

3. The method as claimed in claim 1, comprising, before the generation step, an evaluation step which comprises an evaluation sub-step, during which the processor evaluates parameters relative to passage through a wake turbulence, and a third comparison sub-step, during which the processor compares the parameters with threshold values, and during the generation step the processor generates the report in response to the third comparison sub-step being positive.

4. An onboard system of an aircraft comprising a processor, a receiver, and a transmitter, the processor being configured for implementing:
- a data acquisition step during which the processor retrieves and records data, received by the receiver, relative to each generating aircraft present around the aircraft;
- a position estimation step during which the processor estimates a position of wake turbulences generated by each generating aircraft;
- a proximity step during which the processor determines if the aircraft is close to at least one of the wake turbulences whose positions have been estimated;
- a first computation and comparison step which comprises a first computation sub-step, during which the processor computes external moments to which the aircraft is subjected, and a first comparison sub-step, during which the processor compares the moments with threshold values;
- a generation step during which the processor generates a report, in response to the first comparison sub-step being positive, containing data relative to each wake turbulence which has been considered as being close; and
- a transmission step during which the processor sends the report from the aircraft to a ground installation via the transmitter;
- wherein the threshold values are dynamically adapted according to medium or long term base turbulence levels, encountered by the aircraft, in order to limit incorrect detections.

5. An aircraft comprising an onboard system as claimed in claim 4.

6. One or more non-transitory computer readable media storing instructions that, when executed by one or more computers, cause the one or more computers to perform a method to identify a proximity of a wake turbulence generated by at least one generating aircraft and to generate a report relative to the proximity, the method comprising using an onboard system of an aircraft comprising a receiver, a transmitter, and a processor to implement:
- a data acquisition step during which the processor retrieves and records data, received by the receiver, relative to each generating aircraft present around the aircraft;
- a position estimation step during which the processor estimates a position of wake turbulences generated by each generating aircraft;
- a proximity step during which the processor determines if the aircraft is close to at least one of the wake turbulences whose positions have been estimated;
- a first computation and comparison step which comprises a first computation sub-step, during which the processor computes external moments to which the aircraft is subjected, and a first comparison sub-step, during which the processor compares the moments with threshold values and wherein, during the generation step, the processor generates the report in response to the first comparison sub-step being positive;
- a generation step during which the processor generates a report, in response to the first comparison sub-step being positive, containing data relative to each wake turbulence which has been considered as being close; and
- a transmission step during which the processor sends the report from the aircraft to a ground installation via the transmitter;
- wherein the threshold values are dynamically adapted according to medium or long term base turbulence levels, encountered by the aircraft, in order to limit incorrect detections.

* * * * *